United States Patent [19]
Deambrosio et al.

[11] Patent Number: 4,886,201
[45] Date of Patent: Dec. 12, 1989

[54] SOLDER WAVE NOZZLE CONSTRUCTION

[75] Inventors: Carlos Deambrosio, Laprairie, Canada; James M. Morris, Eldridge, Mo.

[73] Assignee: Electrovert Limited, Ontario, Canada

[21] Appl. No.: 204,452

[22] Filed: Jun. 9, 1988

[51] Int. Cl.[4] .............................................. B23K 3/06
[52] U.S. Cl. ................................................... 228/37
[58] Field of Search ................ 228/37, 180.1, 56.1, 228/260, 56.2

[56] References Cited

U.S. PATENT DOCUMENTS

| | | | |
|---|---|---|---|
| 2,993,272 | 7/1961 | Carlzen et al. | 228/37 |
| 3,151,592 | 10/1964 | Wegener | 228/37 |
| 3,398,873 | 8/1968 | Wegener et al. | 228/37 |
| 4,315,590 | 2/1982 | Kondo | 228/37 |
| 4,465,219 | 8/1984 | Kondo | 228/260 |
| 4,530,457 | 7/1985 | Down | 228/37 |
| 4,659,003 | 4/1987 | Simonetti | 228/37 |
| 4,666,077 | 5/1987 | Rahn et al. | 228/56.1 |
| 4,684,056 | 8/1987 | Deambrosio . | |
| 4,773,583 | 9/1988 | Ishii et al. | 228/37 |

FOREIGN PATENT DOCUMENTS

| | | | |
|---|---|---|---|
| 1002391 | 12/1976 | Canada | 113/89 |
| 0589097 | 1/1978 | U.S.S.R. | 228/37 |

Primary Examiner—Kurt Rowan
Attorney, Agent, or Firm—Darby & Darby

[57] ABSTRACT

A solder wave nozzle construction allows components to be disassembled for cleaning and removing dross from a solder reservoir. The quick connection joints allow downtime for cleaning a solder wave machine to be greatly reduced. In one embodiment a solder nozzle duct fits over a chimney flow duct and has quick release clips on each side. In another embodiment, a quick release back plate, front plate, exit trough, dross reduction tray and front gate are all easily removable. In a further embodiment a solder nozzle duct fits within a chimney flow duct, and has an adjustable height so it can be positioned for optimum solder wave height.

16 Claims, 5 Drawing Sheets

SOLDER WAVE NOZZLE CONSTRUCTION

FIELD AND BACKGROUND OF THE INVENTION

The present invention relates to a nozzle construction for a wave soldering apparatus. More specifically, the present invention provides a nozzle construction that can be quickly assembled and disassembled either when hot or cold for removal of dross and cleaning of a solder pot.

In solder wave machines it is necessary after a certain period of time, to remove dross that forms on the surface of a solder pot or reservoir and on component parts of the solder nozzle such as the front and back plates, the front gate, exit trough and weirs. In the past, the solder machine was shut down for a cleaning time between shifts while the nozzle components are disassembled and cleaned and the dross skimmed off the top of the solder reservoir.

Attempts have been made to reduce dross formation such as the application of oil to the solder wave and the addition of a dross reduction tray such as that shown in copending U.S. application Ser. No. 158,308 filed Feb. 19th, 1988. In this application a solder receiving tray is positioned to receive liquid solder from the solder wave with a level of solder in the tray maintained so that a minimum free fall of solder occurs.

When wave soldering is carried out in atmospheric conditions, then dross is formed at the interface between molten or liquid solder and air. Dross is tin oxide which oxidizes on the surface of liquid solder in contact with air. When the liquid solder surface is turbulent, and this is particularly true in wave soldering devices, then the oxidation rate increases and more dross is formed.

SUMMARY OF THE INVENTION

It is an aim of the present invention to provide a solder wave nozzle construction wherein the parts and components of the solder wave nozzle can be disassembled quickly and easily for cleaning and after cleaning can be replaced in a short time or can immediately be replaced with spare components. It has been found that by utilizing a solder wave nozzle construction, according to the present invention, the components of a solder wave nozzle can be stripped down and removed in approximately a minute, the dross skimmed off the surface of a solder reservoir, and either new components or cleaned components replaced in approximately a further minute so that the whole downtime for the solder machine is less than five minutes.

In one embodiment it is a further aim to provide a solder nozzle assembly that can be easily removed from a chimney flow duct by merely removing two quick release clips. In a further embodiment, there is provided a nozzle that can be adjusted to vertically position the nozzle outlet to suit the particular items being soldered so that there is minimum fall of solder. This will reduce dross formation.

Installation of the solder nozzle and attachment to the chimney flow duct is either by plug and socket type joints or connections or tongue and groove type joints or connections with sufficient clearance so that machining is not required in any of the joints. Furthermore, gaskets are eliminated and alignment problems during installation do not occur. Because gaskets are eliminated and larger clearances are provided at the joints, solder leakage may occur, but the joints are preferably arranged below the dynamic solder level in the solder reservoir so no turbulence occurs in the solder reservoir that could cause more dross to form. The capacity of a solder pump is sufficient to take into account a certain quantity of solder leaking past the quick release joints.

The present invention provides in a wave soldering apparatus including a solder reservoir, a chimney flow duct and pump means to pump solder from the solder reservoir up through the chimney flow duct, the improvement of a solder nozzle construction comprising a solder nozzle duct to fit over the chimney flow duct, the solder nozzle duct having stop means on the inside, positioned above the bottom of the solder nozzle duct to provide a seat for the solder nozzle positioned over the chimney flow duct, and quick connect and disconnect means on the outside at each side of the chimney flow duct to hold the solder nozzle in position over the chimney flow duct. The top of the chimney flow duct is preferably below a dynamic solder level in the solder reservoir, thus ensuring that solder leaking through the joint is not exposed to air.

In another embodiment, there is provided a solder nozzle specifically for a turbulent wave soldering apparatus including a solder nozzle duct having a lower portion that fits within the chimney flow duct, the top of the chimney flow duct being below a dynamic solder level in the solder reservoir, adjustment means to raise and lower the solder nozzle duct and position the solder nozzle duct relative to fixed side plates at each side of the chimney flow duct, and quick removal means to replace the solder nozzle duct from the chimney flow duct. By having the adjustment means to raise and lower the solder nozzle duct easily accessible without having to turn off the machine, one is able to position the solder nozzle so dross formation is kept to a minimum. For example, one quarter inch difference in the height of the solder nozzle relative to printed circuit boards, assemblies or the like passing through the solder wave may increase dross reduction efficiency by as much as 50%.

In yet a further embodiment, a solder nozzle is provided for a wave soldering apparatus including a solder reservoir, a chimney flow duct and pump means to pump solder from the solder reservoir up through the chimney flow duct, the solder nozzle comprising a solder nozzle duct for attachment for chimney flow duct, the solder nozzle duct having a removable front plate and a removable back plate fitting between slots provided in side plates positioned one at each side of the solder nozzle duct, the front plate and back plate having quick release retaining means to the side plates for quick installation and removal.

In another embodiment, an exit trough or exit tray is provided in a solder nozzle that fits into a slot at the top of a back plate of the nozzle, to provide a tongue and groove slot which has sufficient play so that the exit trough is tiltable to vary its slope, and a variable height support is provided to support and position the exit trough at a selected slope. In a further embodiment, a dross reduction tray is provided which has hook clips at each side for quick connection and release. Similarly, a front gate with quick connection and release arrangement between the side plates may also be provided which allows variable positioning to alter the size of the passageway between the front gate and the front plate.

BRIEF DESCRIPTION OF THE DRAWINGS

The invention is illustrated by way of examples in the accompanying drawings wherein.

DESCRIPTION OF THE PREFERRED EMBODIMENTS

Figure 1:
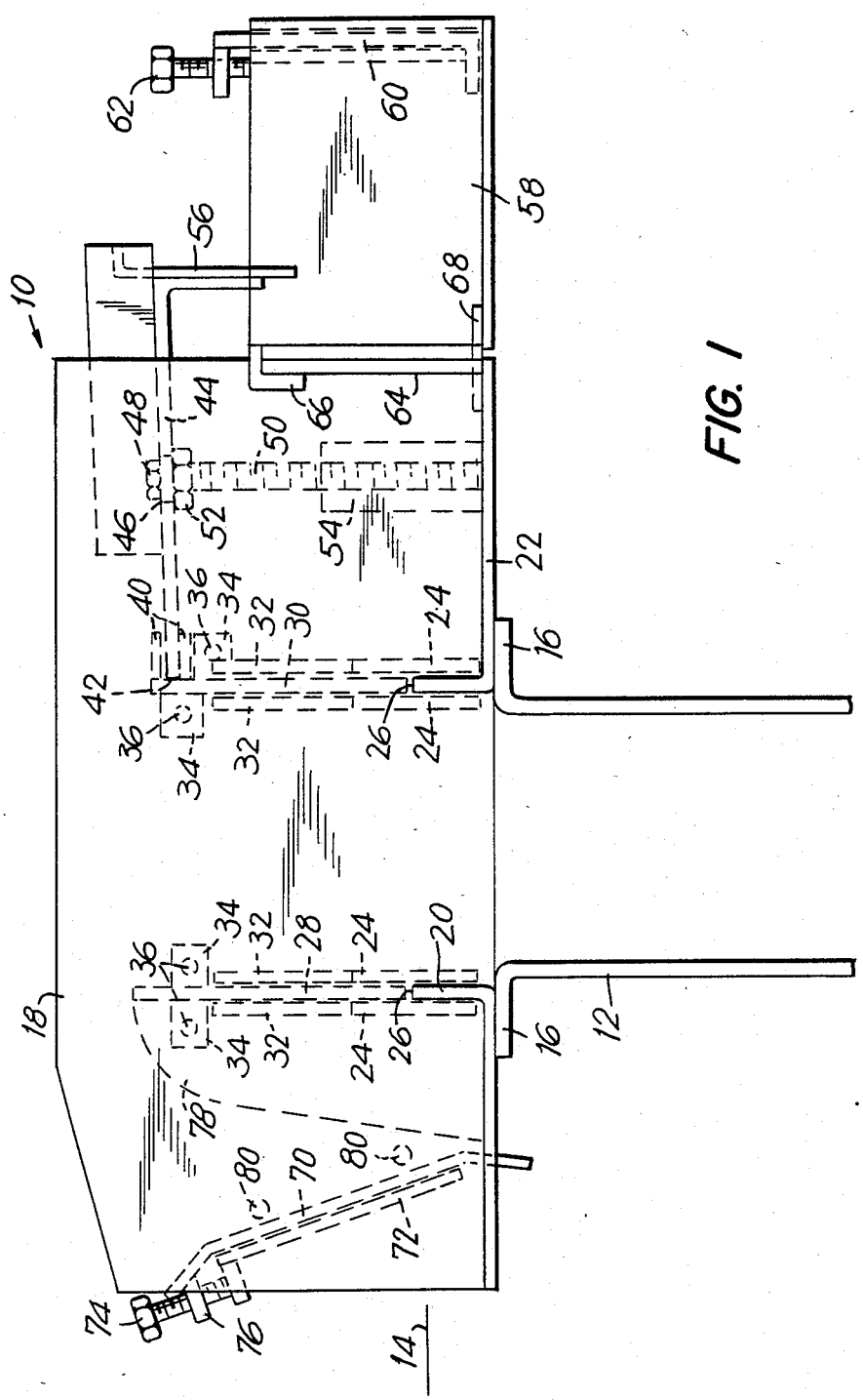
FIG. 1 is a side view of a solder wave nozzle according to the present invention.
Figure 2:
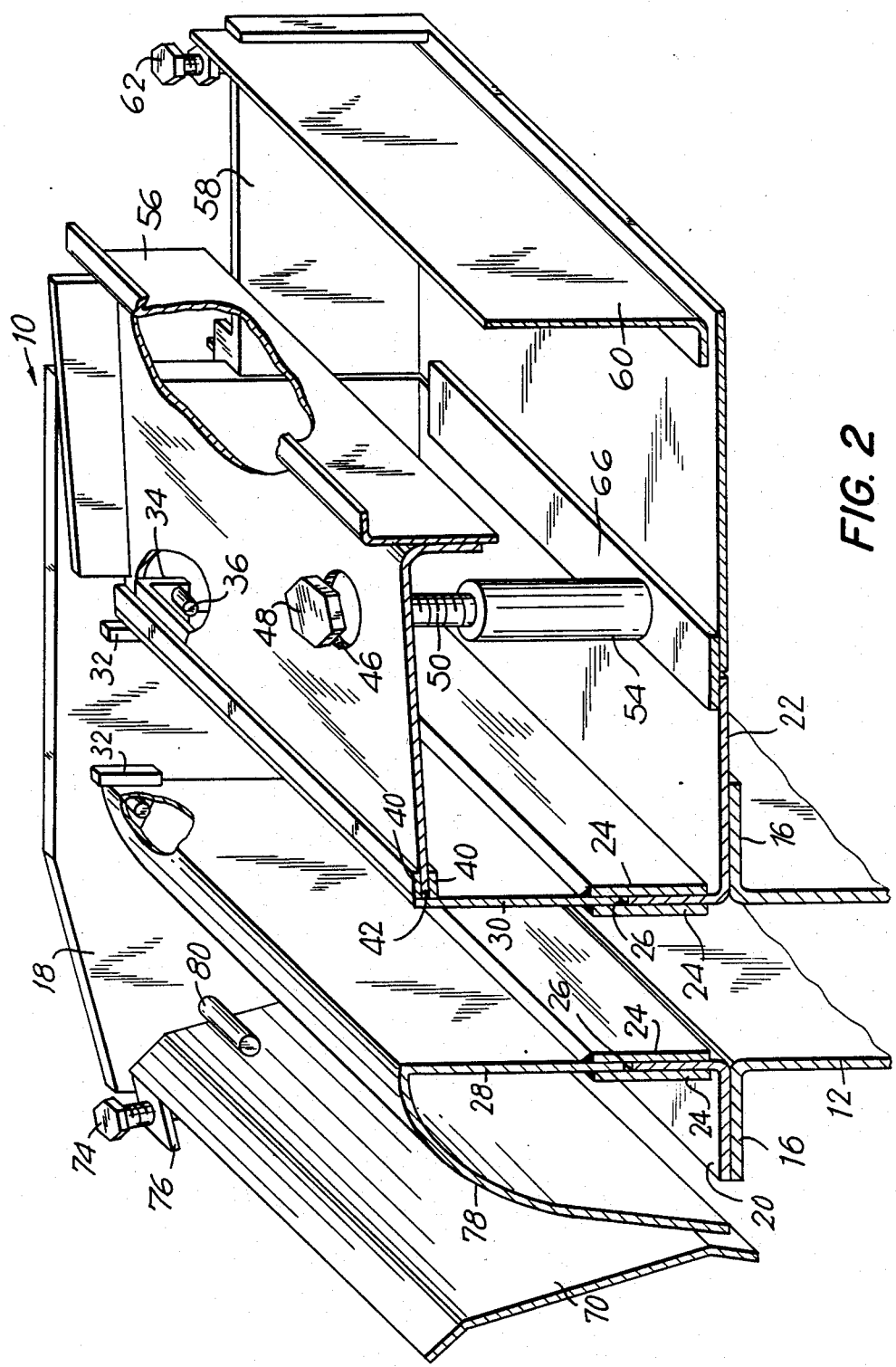
FIG. 2 is an isometric view of the solder wave nozzle shown in FIG. 1.

FIGS. 1 and 2 illustrates a solder wave nozzle 10 mounted on a chimney flow duct 12 positioned in a solder reservoir with a dynamic solder level 14 positioned above the top flanges 16 of the chimney flow duct 12. Side plates 18 are provided on both sides of the nozzle and a front lower angle member 20 is provided to sit on the front flange 16. A back angle member 22 sits on the back flange 16 of the chimney flow duct and extends horizontally to the back end of the side plate 18. These members 20 and 22 are integral with the side plates 18, preferably welded to the side plates. On each side of the vertical arm of the angle members 20, 22 are strips 24 attached preferably welded to the angle member 20, 22 to form a groove or slot 26 into which fits a front plate 28 at the front of the nozzle assembly and a back plate 30 at the back. Thus a tongue and groove joint is provided with the front plate 28 and back plate 30 easily fitting within the slot 26. This joint while permitting some solder leakage, is not at an important area and is substantially in line with the dynamic solder level 14 in the solder pot. Guide strips 32 extend inwards a short distance from each of the side plates 18 and position the front plate 28 and back plate 30. Tabs 34 are connected to side edges of the front plate 28 and back plate 30 to permit pins 36 which pass through the tabs 34 and holes in the side plates 18 to hold the front plate 28 and back plate 30 in position. Thus to remove the front and back plates 28 and 30, it is merely necessary to remove the pins 36 from the outside of the side plates 18 and the front plate 28 and back plate 30 may be lifted out of the slots 26 for cleaning purposes.

As can be seen, the back plate 30 has two flanges 40 at the top forming a substantially horizontal groove 42 into which fits an exit trough 44. The groove 42 is of sufficient width that the exit trough 44 may be tilted to vary the slope of the trough 44 as desired. At each side of the trough 44, locating apertures 46 are provided. Threaded rods 50 fit into threaded sockets 54 attached to the horizontal area of the lower angle member 22. The threaded rods 50 have locating shoulders or flanges 52 on the top which support the exit trough 44 and bolt heads 48 which pass through the locating apertures 46. The bolt head 48 can be rotated to move the trough 44 up and down to change the slope of the exit trough 44. To remove the trough 44 it is merely necessary to lift it off the flanges 52, over the bolt heads 48 and slide the trough 44 out of the groove 42. The trough 44 has an adjustable weir 56 at the end to control the level of solder flowing from the solder nozzle outlet.

A dross reduction tray 58 with an adjustable gate 60 formed by a plate sliding up and down in end grooves in the dross reduction tray side plates, allows control of the flow of solder under the gate 60. Machine screws 62 at each side of the gate 60 move the gate 60 up and down. Outside flanges 64 at the back end of the side plates 18 and on the outside of the side plates 18 are used for hooks 66 attached to the sides of the dross reduction tray 58 so that it is merely necessary to lift up the dross reduction tray 58 and unhook it from the side flanges 64. A cover strip 68 extends along the back end of the horizontal arm of the lower angle member 22 to provide a cover over the joint between the dross reduction tray 50 and the nozzle assembly. However, this joint is below the dynamic solder level in the solder reservoir. Some leakage may occur at this joint, but it does not cause turbulence.

A front gate 70 rests on side ledges 72 attached to the insides of the side plates 18. Machine screws 74 pass through tabs 76 attached to the front gate 70 thus allowing the front gate to be moved up and down on the ledges 72 to provide a variation in the width of passageway between the front gate 70 and a front sloped guide 78 which is connected to the front plate 28. This width of the passageway is varied to take into account different solder flows. Pins 80 are passed from the outside through holes in each of the side plates 18 to hold the front gate 70 in place. By removing the pins, the front gate 70 may be lifted and removed.

As can be seen, not only does the solder nozzle assembly shown in FIGS. 1 and 2 provide easy disassembly, but also provides variable adjustment for the width of the passageway between the front gate 70 and front guide 78, adjustment of the slope of the exit trough 44, adjustment of the height of the weir 56 at the end of the trough 44 and adjustment of the gate 60 in the dross reduction tray 58 to control solder flow. In order of removal, the exit trough 44 and weir 56 are first removed, then the dross reduction tray 58, the front gate 70 followed by the front plate 28 and back plate 30. These are the easily removable components of the solder nozzle and may be cleaned and replaced or alternatively replaced by previously cleaned or new units in a matter of minutes.

Figure 4:
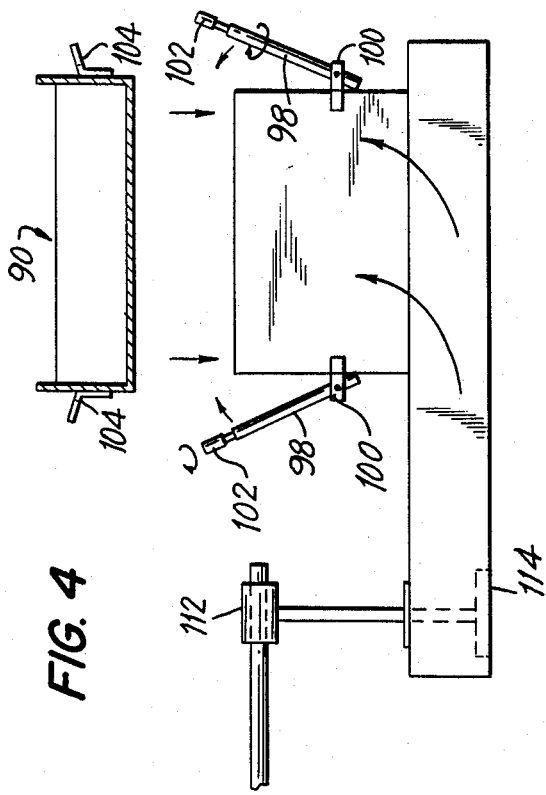
FIG. 4 is a front view of the solder wave nozzle shown in FIG. 3 with the solder nozzle duct separate from the chimney flow duct.
Figure 5:
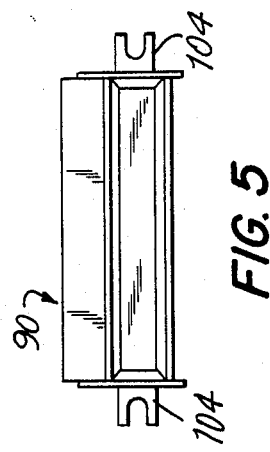
FIG. 5 is a top plan view of the solder wave nozzle shown in FIG. 4.
Figure 3:
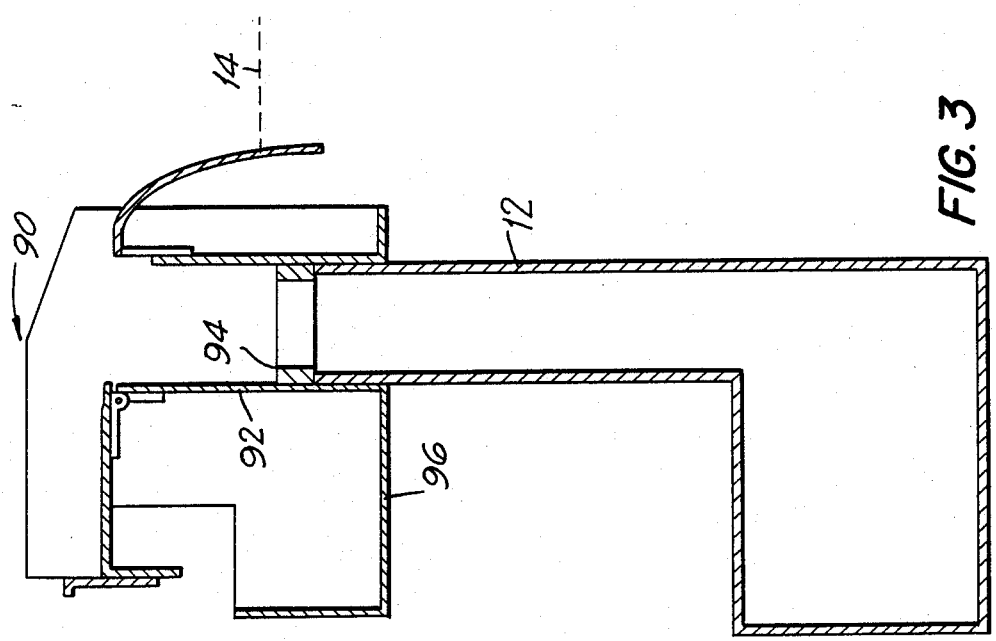
FIG. 3 is a sectional side view of another embodiment of a solder wave nozzle on a chimney flow duct according to the present invention.

A quick connect nozzle assembly 90 is shown in FIGS. 3 to 5 which sits on a chimney flow duct 12. A pump means 112 comprising, for example, a conventional belt-driven impeller 114, is provided to pump solder from the solder reservoir up through the chimney flow duct 12. A solder nozzle duct 92 has a shoulder 94 which in the example shown is bar stock welded to the inside of the solder nozzle duct 94 to form a location stop to position and hold the nozzle assembly 90 to the chimney flow duct 12. The shoulder 94 also forms a partial seal to prevent solder leaking back to the reservoir. As can be seen, the stop 94 is located below the dynamic solder level 14 in the solder reservoir so any leakage that might occur in the joint between the chimney flow duct 12 and the solder nozzle duct 92 remains below the dynamic solder level in the reservoir. As can be seen, the bottom flange 96 of the solder nozzle 90 is also below the dynamic solder level, preferably in the order of about 1 to 2" below.

On the sides of the chimney flow duct 12 are two rods 98 with a pivot connection 100 as shown in FIG. 4. The upper ends of the rods 98 are threaded so that a nut 102 can be loosely attached. The rods 98 are arranged so that they can pivot outwards a sufficient distance to avoid slotted tabs 104 on the nozzle assembly 90 as shown in FIG. 5. When the nozzle assembly 90 is fitted over the chimney flow duct 12, the rods 98 engage the slotted tabs 104 and the nuts 102 are tightened to lock the tabs 104 and hold the nozzle assembly 90 in place.

To remove the nozzle assembly 90 it is merely necessary to loosen the nuts 102 three or four turns, pivot the connection rods 98 to clear the slotted tabs 104 and then lift off the nozzle assembly 90. Thus even though the dynamic solder level is above the top of the chimney flow duct, the two rods 98 provide guides to ensure that the nozzle assembly is placed over the flow duct 12.

Figure 6:
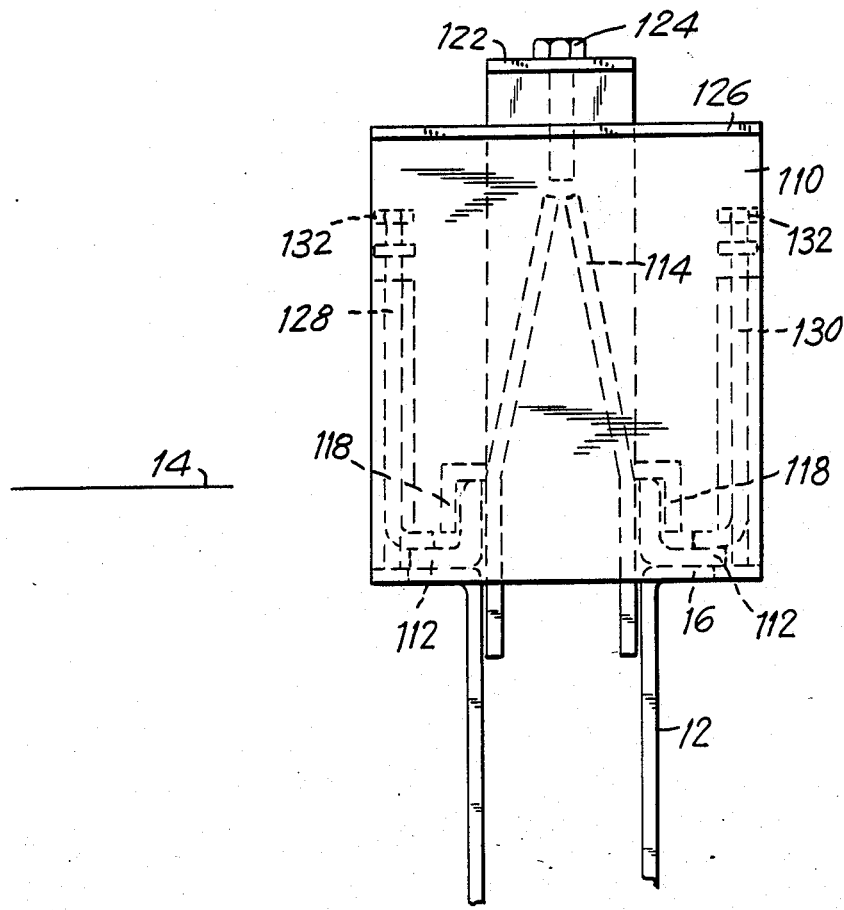
FIG. 6 is an end view of a solder wave nozzle according to another embodiment of the present invention.
Figure 7:
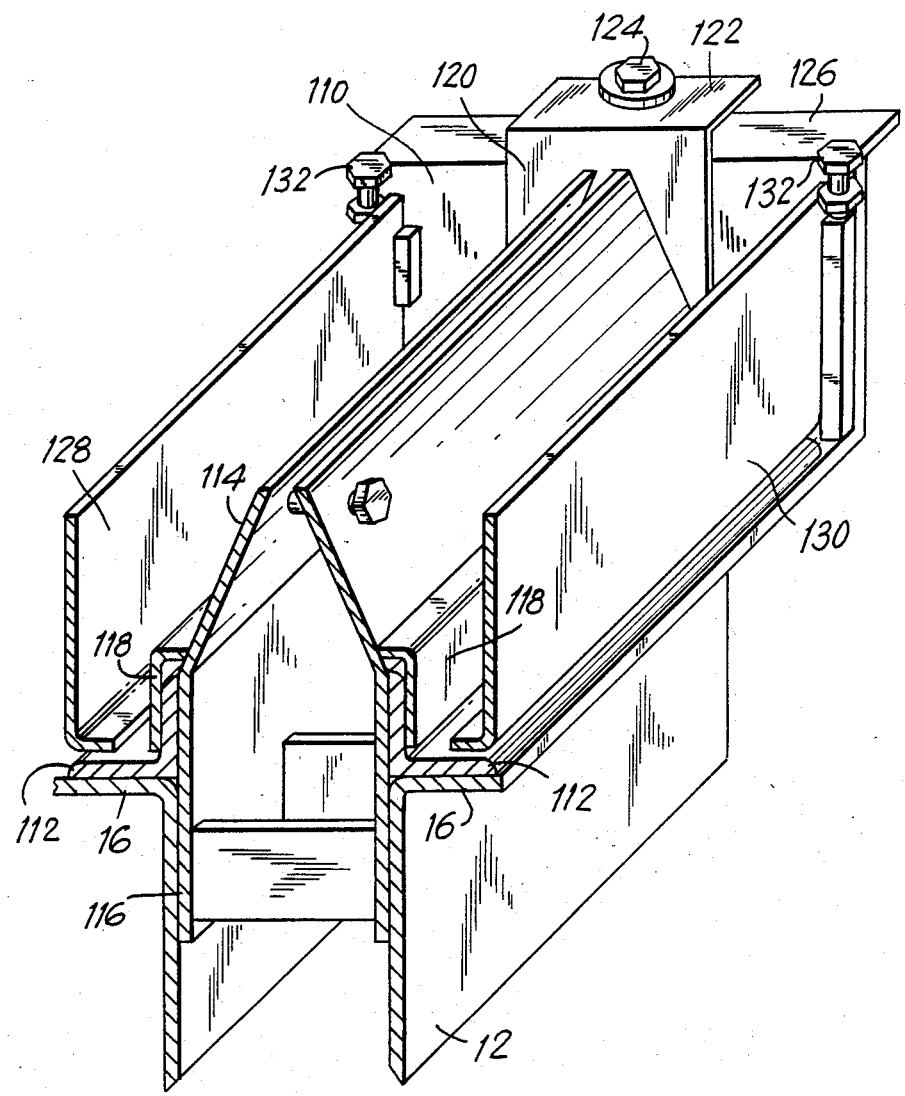
FIG. 7 is an isometric view of the solder wave nozzle shown in FIG. 6.

A turbulent wave nozzle assembly is shown in FIGS. 6 and 7 for fitting over a chimney flow duct 12. The chimney flow duct has flanges 16 similar to that shown in FIGS. 1 and 2. Fixed side plates 110 are provided at each side of the chimney flow duct 12. Between the side plates 110 are angle member 112 welded to each of the side plates 110 extending between the side plates and having one flange resting on the flange 16 of the chimney flow duct 12. A nozzle 114 having a lower portion 116 to fit within the flow duct 12, has flanges 118 on each side which fit over the top of the angle members 112. The nozzle 114 has adjustable side plates 120 which are positioned adjacent and inside the fixed side plates 110. The adjustable side plates 120 are preferably welded to the front and back plates of the nozzle 114. The adjustable side plates 120 have top flanges 122 which extend outwardly above the fixed side plates 110. Machine bolts 124 pass through holes in the top flanges 122 of the adjustable side plates 120 and through tapped holes in flanges 126 of the fixed side plates 110 so that by turning the bolts 124 at each side, the nozzle 114 can be raised and lowered. This is an important feature, to give an adjustable height nozzle. When the nozzle is adjusted, one obtains optimum solder wave height to reduce stripped joints where solder skips while clearing the leads. An optimum solder wave height can result in less dross being formed, and by accurately controlling the height of the nozzle with relation to a printed circuit boards assemblies or the like one is able to reduce dross formation.

At the front and back of the nozzle assembly is a front gate 128 and a back gate 130. These gates extend down to just above the horizontal flange of the angle members 112. Adjustable bolts 132 allow the gates 128 and 130 to be moved up and down to control the flow of solder between the gates and the angle members 112 back into the solder reservoir. The dynamic solder level 14 is shown to be above the gate openings so that there is a minimum of turbulence when the solder flows back into the solder reservoir.

Various changes may be made to the devices shown herein, different components may be made removable and adjustable for quick release and quick assembly without departing from the scope of the present invention which is limited only by the following claims.

The embodiments of the invention in which an exclusive property or privilege is claimed are defined as follows.

1. In a wave soldering apparatus including a solder reservoir, a chimney flow duct and pump means to pump solder from the solder reservoir up through the chimney flow duct, the improvement of a solder nozzle construction comprising:

a solder nozzle duct to fit over the chimney flow duct, the solder nozzle duct having stop means on the inside, positioned below the solder nozzle duct to provide a seat for the solder nozzle positioned over the chimney flow duct, and quick connect and disconnect means on the outside at each side of the chimney flow duct to hold the solder nozzle in position over the chimney flow duct.

2. The wave soldering apparatus according to claim 1 wherein the top of the chimney flow duct is below a dynamic solder level in the solder reservoir.

3. The wave soldering apparatus according to claim 2 wherein the stop means comprises an internal shoulder extending around the inside of the solder nozzle duct to act as a partial seal to reduce solder leakage between the solder nozzle duct and the chimney flow duct.

4. The wave soldering apparatus according to claim 1 wherein the quick connect and disconnect means comprises a rod pivotally attached on the outside at each side of the chimney flow duct, each rod having a free end with limited tilt movement and engaging in tab engagement means on the sides of the solder nozzle duct, each rod having attachment means at the free end to engage and lock the tab engagement means.

5. A solder nozzle for a wave soldering apparatus including a solder reservoir, a chimney flow duct and pump means to pump solder from the solder reservoir up through the chimney flow duct, the solder nozzle comprising:

a solder nozzle duct for attachment to the chimney flow duct, the solder nozzle duct having a removable front plate and a removable back plate fitting between slots provided in side plates positioned one at each side of the solder nozzle duct, the front plate and back plate having quick release retaining means to the side plates for quick installation and removal.

6. The solder nozzle according to claim 5 wherein the quick release retaining means comprises pins insertable through tabs on the front plate and back plate to location holes provided in the side plates.

7. The solder nozzle according to claim 5 including an exit trough removably fitting into slot means at the top of the removable back plate, the exit trough being tiltable in the slot means to vary slope of the exit trough, and variable height support means to support and position the exit trough at a selected slope.

8. The solder nozzle according to claim 7 wherein the variable height support means comprises a threaded rod with a shoulder on top to support the exit trough and the threaded rod has a protruding portion to fit into a locating hole in the exit trough.

9. The solder nozzle according to claim 5 including a back overflow weir on the exit trough and a dross reduction tray positioned beneath the back overflow weir, the dross reduction tray having a hook clip means at each side for quick connection and release.

10. The solder nozzle according to claim 9 wherein the hook clip means at each side engages a flange outside each of the side plates.

11. The solder nozzle according to claim 5 including a front gate with quick connection and release means between the side plates adjacent the front plate, and including variable positioning means to vary size of passageway between the front gate and the front plate.

12. The solder nozzle according to claim 5 wherein the removable front plate and removable back plate each have a tongue and groove connection at the base.

13. A solder nozzle for a wave soldering apparatus including a solder reservoir, a chimney flow duct and pump means to pump solder from the solder reservoir up through the chimney flow duct, the solder nozzle comprising:

a solder nozzle duct having a lower portion that fits within the chimney flow duct, the top of the chimney flow duct being below a dynamic solder level in the solder reservoir, adjustment means to raise and lower the solder nozzle duct and position the solder nozzle duct relative to fixed side plates at each side of the chimney flow duct, and quick removal means to remove and replace the solder nozzle duct from the chimney flow duct.

14. The solder nozzle according to claim 13 wherein the solder nozzle duct is attached to adjustable side plates which move vertically with regards to the fixed side plates and including locking means to lock the adjustable side plates to the fixed side plates.

15. The solder nozzle according to claim 13 including adjustable flow gates positioned in the front and the back of the solder nozzle duct.

16. A solder nozzle for a wave soldering apparatus comprising a front plate and back plate positioned at the front and back of the solder nozzle;

an exit trough fitting into a slot at the top of the back plate to provide a tongue and groove connection means, the connection means having sufficient play so that the exit trough is tiltable to vary its slope and variable height support means to provide support and position the exit trough at a selected slope.

* * * * *